United States Patent [19]

Brown et al.

[11] 4,427,549

[45] Jan. 24, 1984

[54] DEIONIZATION METHOD AND APPARATUS

[75] Inventors: Keith E. Brown, Solon; Jimmy D. Buth, Chardon, both of Ohio

[73] Assignee: Kinetico, Inc., Newbury, Ohio

[21] Appl. No.: 409,586

[22] Filed: Aug. 19, 1982

[51] Int. Cl.³ .................... B01J 47/14; B01J 49/00
[52] U.S. Cl. .................... 210/662; 210/678; 210/685; 210/98; 210/264
[58] Field of Search ............ 210/662, 670, 678, 685, 210/88, 98, 105, 136, 190, 191, 264, 278

[56] References Cited

U.S. PATENT DOCUMENTS

| | | | |
|---|---|---|---|
| 2,841,550 | 7/1958 | Beohner | 210/685 |
| 3,458,438 | 7/1969 | Smith et al. | 210/685 |
| 3,876,539 | 4/1975 | Yocum | 210/98 |
| 3,891,552 | 6/1975 | Prior et al. | 210/88 |
| 3,960,721 | 6/1976 | Heskett | 210/662 |
| 4,298,025 | 11/1981 | Prior et al. | 210/190 |

OTHER PUBLICATIONS

"Autotrol Deionization Control Systems" Technical Bulletin.
"Two-Bed Deionizers", Aqua Media Technical Bulletin.
"Ion Exchange is a Versatile Tool", *Water Treatment Power*, Dec. 1958, pp. 96-101.
"Ion Exchange", *Power*, Sep. 1980, pp. S1-S13.
"Duolite A-104", Diamond Shamrock Chemical Co. Technical Bulletin.
"Duolite C-20", Diamond Shamrock Chemical Co. Technical Bulletin.

*Primary Examiner*—Ivars C. Cintins
*Attorney, Agent, or Firm*—Watts, Hoffmann, Fisher & Heinke Co.

[57] ABSTRACT

A deionization method and apparatus comprising separate cation and anion removing sections 10a, 10b, the cation section having separate tanks 14, 16 and the anion section having separate tanks 24, 26. Respective cation and anion control valve assemblies 18, 28 control the fluid communication between various components of respective sections and control the regeneration cycle of exhausted cation and anion tanks, respectively. Each valve assembly includes independent water usage monitoring devices 118 which, upon sensing a predetermined quantity of water discharge by its respective valve assembly, effects regeneration of an associated tank. An exhausted cation tank is regenerated by feeding cation regeneration fluid by way of the cation control valve assembly into the exhausted cation tank in a counterflow direction for a predetermined time. Decationized water from the on-line cation tank is then passed through the exhausted cation tank in a counterflow direction to effect a counterflow rinse. An exhausted anion tank is similarly regenerated using an anion regeneration fluid and passing it through the exhausted tank in a counterflow direction, followed by a counterflow rinse using deionized water from the on-line anion tank. The anion section also includes a flushing circuit 46 that flushes residual anion regeneration fluid from a supply line 40a and the anion control valve assembly and also effects a counterflow slow rinse prior to a counterflow fast rinse. Water for the flushing step is obtained from a valve operating chamber 102a by way of a restricted passage 218 so that a back pressure in the piston chamber is maintained in order to exert a valve operating force on a valve 78 when necessary.

15 Claims, 7 Drawing Figures

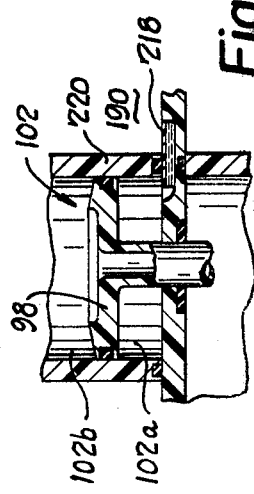
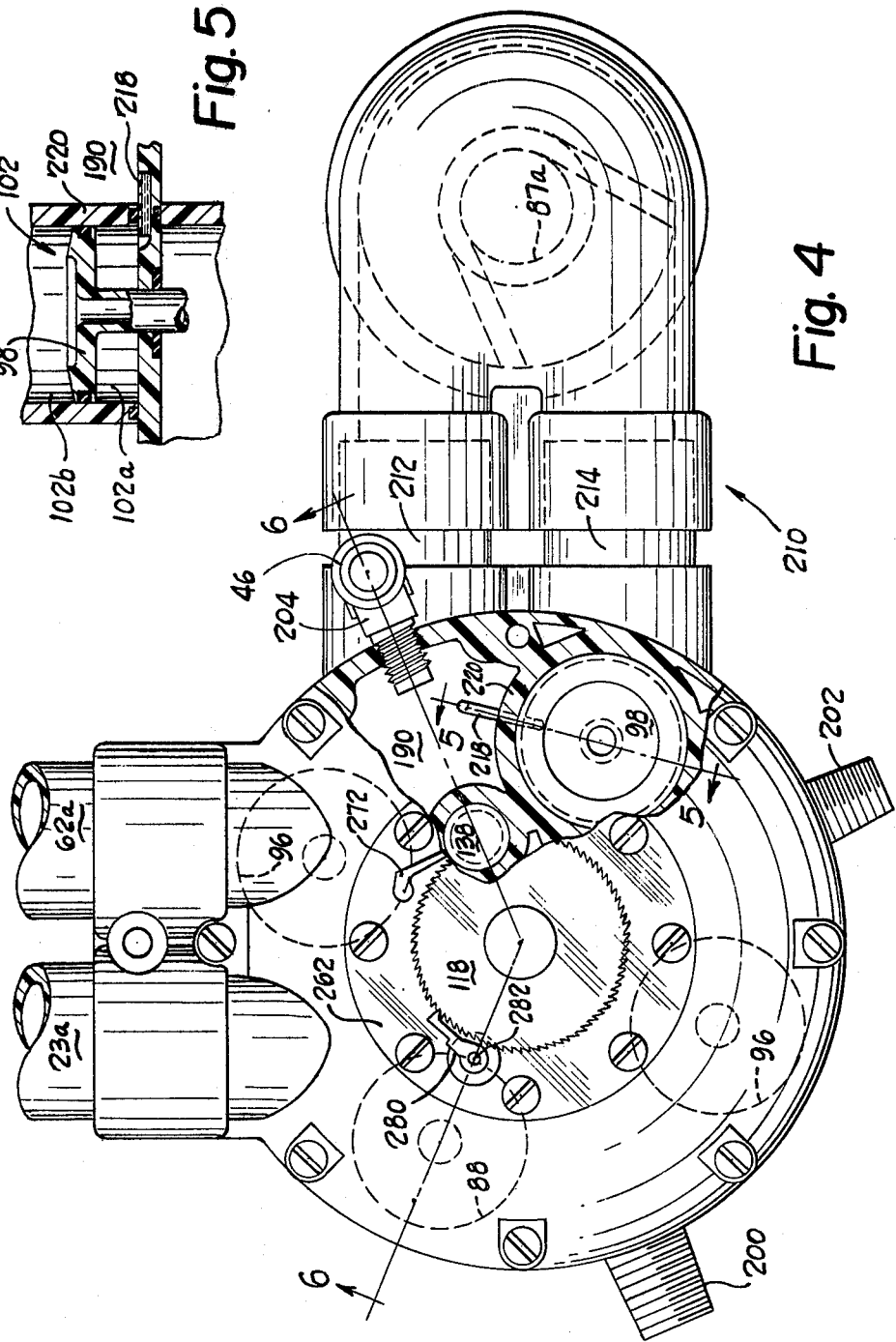

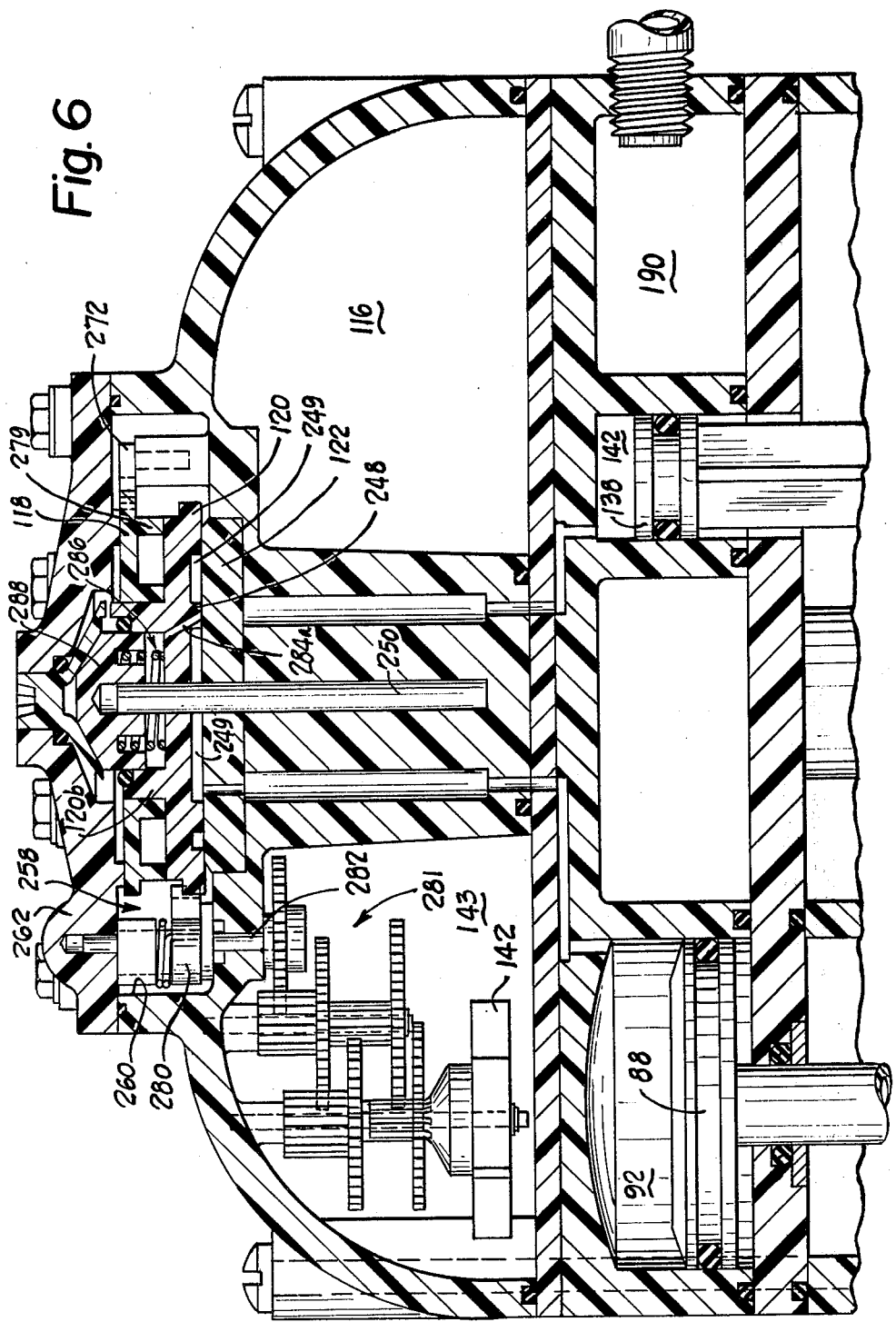

DEIONIZATION METHOD AND APPARATUS

DESCRIPTION

1. Technical Field

The present invention relates generally to water treatment processes and in particular to a method and apparatus for deionizing water.

2. Background Art

Water that is free of dissolved minerals is desirable for many chemical processes and a variety of other applications. The reduction of the overall mineral content in water is typically achieved by either: (a) a distillation process; or, (b) a deionization process.

Although a distillation process can provide acceptable "demineralized" water, it can be costly to operate and more importantly, it is virtually impossible to directly and continuously distill a water supply "on-line" so that distilled water under pressure is available at a tap. Deionizing apparatus, on the other hand, can be placed in the water supply flow path and removes or reduces the mineral content of the water as it is used.

Apparatus and methods for producing deionized water, also termed "demineralized" or "mineral-free" water, have been suggested by the prior art. The apparatus for deionizing water normally utilizes a cation exchange resin that is operative to exchange its positive ions with positive ions carried by the water such as calcium, magnesium, sodium, iron, etc., and an anion exchange resin that is operative to exchange its negative ions with negative ions carried by the water such as sulfate, phosphate, carbonate, chloride, etc.

The cation and anion resins are contained in either individual tanks or mixed in a single tank. The former configuration is usually termed a "separate bed" system whereas the latter is usually termed a "mixed-bed" system Although the mixed-bed type of deionizer is usually capable of producing a higher quality water, a mixed-bed deionizer is usually more difficult to regenerate than a separate bed deionizer. A separate bed deionizer is preferred in those applications where an extremely high water purity is not required and is also used upstream of a mixed-bed deionizer in order to pre-treat the water to remove the bulk of the ions. With this latter arrangement, regeneration frequency of the mixed-bed deionizer is reduced.

As is well known in the art, both the cation and anion exchanging material must be regenerated to replace the ions transferred to the water. The frequency of regeneration is usually a function of the volume of water treated as well as the quality of the water supply. The regeneration frequency for the cation and anion resins may be different.

In many commercially available separate bed deionization systems, the electrical conductivity of the water is monitored and when it falls below a preset value both the cation and the anion beds are regenerated. In other systems, the cation and anion beds are regenerated at predetermined time intervals.

In most if not all systems, the cation and anion beds are regenerated at the same frequency, either sequentially or concurrently. In these typical systems, even though only one bed may require regeneration, both beds are regenerated. Up to now, it was believed unfeasible and impractical to regenerate the cation and anion beds independently of each other. It should be obvious that unnecessary regeneration of a bed, although not harmful to the bed, is chemically wasteful. In addition, in those systems which employ single cation and anion tanks, system excessive down-time necessary to regenerate both tanks is undesirable.

Apparatus and methods for "softening" water are somewhat related to deionization. In a water softening process, only a single resin bed is used. In operation, the bed exchanges sodium ions for calcium, magnesium and soluble iron ions in the water. The softening process differs from deionization in that softened water contains sodium ions in place of the mineral ions whereas deionized water is free of both cations and anions.

U.S. Pat. Nos. 3,891,552 and 4,298,025, which are both owned by the present Assignee, disclose water softener control valves. Both valves monitor water usage and regenerate the resin bed at a frequency determined by the amount of water discharged by the water softening apparatus. The disclosed control valves are totally independent of an external power source and are operated solely by the pressure of the water supply. It has been found desirable to provide a similar type of control arrangement for a deionization process so that the regeneration of the cation and anion beds would occur independently and be a function of the amount of water treated by the respective beds.

DISCLOSURE OF THE INVENTION

The present invention provides a new and improved apparatus and method for deionizing water. In the preferred method, a pair of cation and anion tanks, each containing respective cation and anion exchange material are provided. One cation and anion tank are placed "on-line" with the water supply while the other cation and anion tanks are maintained "off-line" until the on-line tanks are exhausted and require regeneration.

In operation, water to be treated is first passed through the on-line cation tank and the resulting "decationized" water is then transferred to and passed through the anion tank to produce deionized water.

In accordance with the invention, the amount of water treated by the cation tank and the anion tank are independently monitored and regeneration is initiated when predetermined amounts of decationized water and deionized water are discharged by the cation and anion tanks, respectfully. The cation tank is regenerated after a predetermined amount of water is decationized; the anion tank is regenerated after a predetermined amount of decationized water is deionized. Thus, with the present invention, the cation and anion tanks are regenerated totally independently of each other and at different frequencies if the rate at which the cation and anion exchange resins become exhausted, is different.

In the preferred and illustrated embodiment, an exhausted cation tank is regenerated by first placing the off-line cation tank on-line in series with the anion tank while placing the exhausted cation tank off-line. Regeneration fluid is then passed through the exhausted cation tank in a counterflow direction for a predetermined time. The regeneration fluid is discharged from the cation tank to drain. The off-line cation tank is then rinsed with decationized water from the on-line cation tank. The rinse water flows through the tank in a counterflow direction and is ultimately discharged to drain. After the rinse step, the now regenerated cation tank is maintained off-line until the on-line cation tank requires regeneration.

The anion tank is regenerated after a predetermined volume of water is deionized. Regeneration is achieved by first placing the other anion tank on-line, in series with the cation tank. The exhausted anion tank is regenerated by passing regeneration fluid through the exhausted anion tank in a counterflow direction for a predetermined time. The regeneration fluid is discharged to drain after leaving the tank. The off-line anion tank is then rinsed by conveying deionized water from the other anion tank through the tank in a counterflow direction. The rinse water is also discharged to drain. The regenerated anion tank is maintained off-line until the on-line tank is exhausted.

With the present invention, the cation and anion tanks are regenerated only when they become exhausted and each is regenerated independently of the other. Unlike the prior art, water flow through the tanks is independently monitored and the frequency of regeneration is determined by the rate at which the respective resins are exhausted.

According to a feature of the invention, the anion regeneration process includes a flushing step that occurs prior to rinsing. According to this feature, deionized water from the on-line anion tank is communicated to a regeneration fluid supply conduit to flush out residual regeneration fluid which might otherwise leach into the water flow path when the regenerated tank was placed on-line. This flushing step also provides another advantageous feature. By prolonging the flushing step, a relatively slow rinse of the anion tank is provided prior to the normal fast rinse. By slow rinsing the anion tank, the anion regeneration fluid is allowed to proceed to a more complete reaction with the resin and thus the regeneration fluid is used more effectively.

A similar flushing step can also be included in the regeneration of the cation tank if desired. Although leaching of the cation regeneration fluid is not considered as serious a problem as that of the anion regeneration fluid, more effective use of the cation regeneration fluid will be obtained due to the slow rinsing of the cation tank.

The apparatus for effecting the method steps of deionizing water disclosed above, preferably comprises a pair of cation tanks interconnected by a fluid pressure operated control valve assembly and a pair of anion tanks interconnected by another fluid pressure operated control valve assembly. A transfer conduit transfers decationized water from the cation tanks to the anion tanks.

The cation control valve assembly controls which of the two cation tanks is placed on-line and monitors the amount of water treated by the on-line tank. After a preset amount of water is sensed, the control valve assembly places the off-line tank on-line and regenerates the exhausted tank and maintains it off-line until the on-line tank requires regeneration.

The anion control valve is similar to the cation valve. It controls the fluid communication of the anion tanks with the transfer conduit. The anion valve is operative to place one of the anion tanks on-line in series with the on-line cation tank and monitors the amount of water treated by the on-line tank. After a predetermined volume is sensed, the anion control valve places the other anion tank on-line and regenerates the exhausted anion tank off-line.

According to the preferred embodiment, both the cation and anion control valve assemblies are related to the water softening control apparatus disclosed in U.S. Pat. Nos. 3,891,552 and 4,298,025 which issued on June 24, 1975 and Nov. 3, 1981, respectively, which are both hereby incorporated by reference.

The control valve assemblies disclosed in these Patents, include: a pair of inlet valves for controlling the fluid communication between the inlet to the ion exchange tanks and the source of water to be treated; a pair of outlet valves for controlling the communication between the outlets of the tanks and an outlet conduit; a pair of drain valves for controlling the communication between the tanks and a drain; and, a regeneration control valve for initiating and controlling a regeneration cycle. Actuation of the various valves is controlled by a signal pressure system including a rotatable disc that controls the communication of pressurized water to ports that communicate with piston operating chambers associated with each valve. Rotation of the disc is effected by a turbine disposed in a fluid flow path. The turbine is automatically activated whenever regeneration is required. The control valve assemblies also include a water usage monitor that is driven by a turbine disposed in the softened water flow path. A regeneration cycle is initiated whenever a predetermined amount of water is sensed.

The cation and anion control valves of the present invention retain the inlet, outlet, drain and regeneration control valves disclosed in these prior patents. The fluid pressure operated control system including the regeneration control and water usage monitoring discs, in principle are the same but are modified to provide the necessary cation and anion regeneration steps.

In accordance with the invention, the anion control valve includes a flushing circuit for cleansing the regeneration supply line of residual anion regeneration fluid and also provides a slow rinse step. In the preferred embodiment, one of the outlet valves is operated by a piston disposed in an expansible chamber. Water pressure is communicated either above or below the piston by the regeneration control disc to apply opening and closing forces to the outlet valve. A restricted fluid passage communicates with one side of the piston such that whenever fluid pressure is applied to the associated chamber, a restricted flow of fluid from the chamber is conveyed to a flushing conduit. By communicating fluid from the chamber by way of a restricted passage, a fluid back pressure is created in the chamber which applies a force to the piston. In an absence of an opposing force in the other chamber, the force developed in this chamber is sufficient to move the outlet valve.

In the preferred embodiment, the regeneration supply conduit includes a check valve that allows fluid flow from the regeneration fluid supply to the control valve assembly but prevents reverse flow. A metering valve for adjusting the flow rate of regeneration fluid is located between the check valve and the control valve assembly. The flushing conduit is connected to the regeneration supply conduit intermediate the metering valve and the check valve, preferably as close to the check valve as possible.

As disclosed in the prior patents, the regneration supply conduit communicates with the throat of a venturi that is used to inject regeneration fluid into a regeneration fluid flow path during a portion of the regeneration cycle. When water is passed through the venturi, regeneration fluid is drawn from the regeneration supply conduit and mixed or "aspirated" with the water. When flushing of the conduit is desired, a fluid signal is communicated to the chamber from where it then flows, via the restricted passage, to the flushing conduit.

The fluid then enters the regeneration supply conduit downstream of the check valve and flows through the metering valve into the venturi. The fluid communicated through the flushing conduit prevents further regeneration fluid to be drawn by the venturi from the source and hence the line is cleansed. In addition, by maintaining the flow of flushing fluid, the tank being regenerated is rinsed at a relatively low flow rate by the flush water.

A similar flushing circuit can be incorporated on the cation tank in order to cleanse the cation regeneration supply conduit of residual regeneration fluid as well as provide a slow rinse of the cation tank.

Additional features of the invention will become apparent and a fuller understanding obtained upon reading the following detailed description made in connection with the accompanying drawings.

BRIEF DESCRIPTION OF THE DRAWINGS

FIG. 4 is a top plan view of a control valve assembly constructed in accordance with the preferred embodiment of the invention with portions broken away to show interior detail;

FIG. 5 is a fragmentary sectional view of the control valve assembly as seen from the plane indicated by the line 5—5 in FIG. 4; and, FIG. 6 is an enlarged, fragmentary sectional view of the control valve assembly as seen from the plane indicated by the line 6—6 in FIG. 4.

BEST MODE FOR CARRYING OUT THE INVENTION

Figure 1:
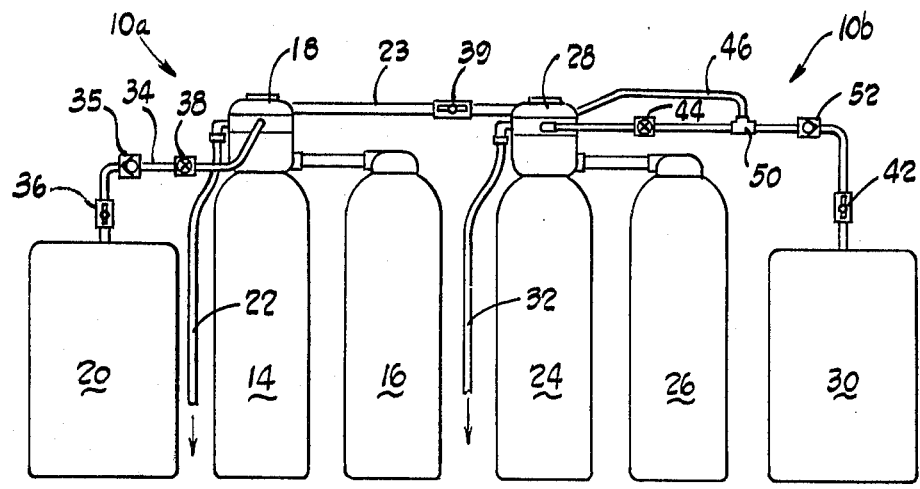
FIG. 1 is a side elevational view of an apparatus for deionizing water, constructed in accordance with the preferred embodiment of the invention.
Figure 2:
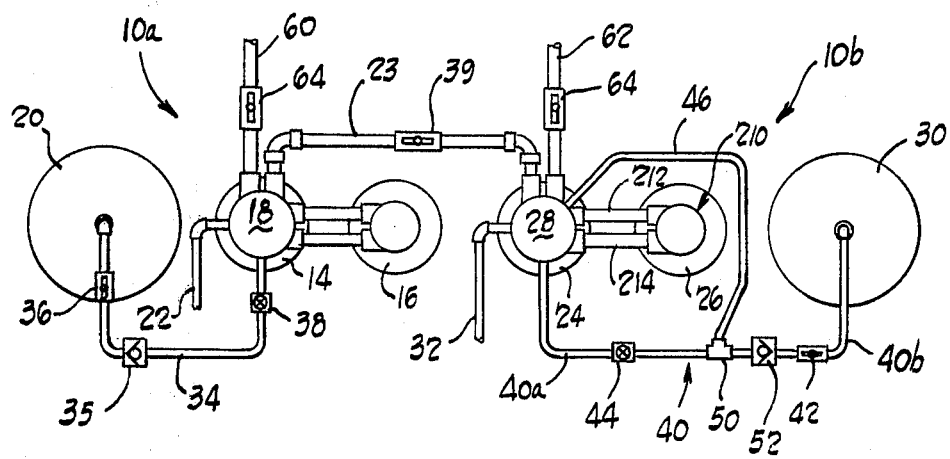
FIG. 2 is a top plan view of the apparatus shown in FIG. 1.

FIGS. 1 and 2 illustrate the overall construction of an appartus for deionizing water that embodies the present invention. For purposes of explanation the apparatus can be divided into two parts, the cation-removing removing section indicated generally by the reference character 10a and the anion-removing section indicated generally by the reference character 10b. The illustrated apparatus would be termed a "separate bed" deionizer because the cation and anion exchange resins are contained in separate tanks.

The cation section 10a comprises a pair of cation tanks 14, 16 each containing cation exchange material. A control valve assembly 18, to be described, interconnects the cation tanks 14, 16 and controls the intercommunication between the tanks, the communication between the tanks and the water supply and the regeneration of an exhausted tank. The control valve assembly 18 communicates with a source of cation regeneration fluid contained in a separate vessel 20. Typically the regeneration fluid is either sulfuric ($H_2SO_4$) or hydrochloric (HCL) acid. The valve assembly 18 also communicates with a drain (not shown) by way of an ambient drain conduit 22. In normal operation, regeneration effluent is dumped to the drain via this conduit.

Decationized water leaving the cation section 10a is conveyed to the anion section 10b by a transfer conduit 23. The anion section 10b comprises a pair of anion tanks 24, 26 each containing anion exchange resin. An anion control valve assembly 28 interconnects the anion tanks 24, 26 and controls the intercommunication between the tanks, the communication between the tanks and the transfer conduit 23 and the regeneration of an exhausted anion tank. The anion valve assembly communicates with a source of anion regeneration fluid contained in a separate vessel 30. The regeneration fluid is typically a caustic chemical such as sodium hydroxide (NaOH). The anion valve assembly 28 also communicates with an ambient drain through a drain conduit 32.

Referring in particular to FIG. 2, additional details of the plumbing connections are illustrated. The cation regeneration fluid supply vessel 20 communicates with the cation control valve assembly 18 through a supply conduit 34 that includes a check valve 35. The check valve 35 allows fluid flow from the vessel 20 into the valve assembly 18 but prevents reverse flow. A shut-off valve 36 and metering valve 38 are preferably disposed in the line to control the flow of regeneration fluid to the valve assembly 18. The transfer conduit 23 also includes a hand valve 39 which provides a means for isolating the cation and anion sections 10a, 10b.

The anion section 10b includes similar plumbing components. In particular the anion regeneration fluid supply vessel 30 communicates with the anion control valve assembly 28 through a regeneration supply conduit 40 having two portions 40a, 40b. Like the cation supply conduit 34, the anion conduit includes both a hand valve and a metering valve 42, 44 for adjusting and controlling the flow of regeneration fluid to the control valve assembly 28.

In the illustrated apparatus, the anion section 10b also includes an additional fluid circuit which, as will be described, provides a method for flushing residual regeneration fluid from the conduit portion 40a of the regeneration supply conduit and also provides a slow rinse function during the portion of a regeneration cycle of an anion tank. As seen in FIG. 2, the flushing circuit comprises an additional conduit 46 extending from the control valve assembly 28 and joined to the regeneration supply conduit 40 at a tee 50. A check valve 52 is disposed in the regeneration supply line 40 intermediate the tee 50 and the shut-off valve 42. The check valve 52 allows fluid flow from the regeneration fluid vessel 30 to the control valve assembly 28 but prevents flow to the vessel from either the conduit 46 or the portion 40a of the regeneration supply line downstream of the tee connection 50.

Although the flushing circuit is illustrated as part of the anion section 10b only, the same circuit can be incorporated as part of the cation section in order to flush residual cation regeneration fluid from the cation supply line 34 and to provide a slow rinse for a portion of a cation regeneration cycle.

Water to be treated is introduced into the deionization apparatus through an inlet conduit 60. Deionized water leaves the apparatus through an outlet conduit 62. Both conduits 60, 62 may include hand valves 64 for isolating the untreated and treated water supply from the apparatus.

In normal operation, water to be treated enters the cation section of the deionization apparatus through the inlet conduit 60. The cation control assembly 18 places one of the cation tanks 14, 16 "on-line" and maintains the other tank "off-line" until the on-line tank is exhausted. The water introduced into the valve assembly 18 travels through the on-line tank, exchanging cations such as sodium, calcium, magnesium, iron, etc. for hydrogen ions held by the cation resin.

For purposes of explanation, assume that the cation tank 14 is on-line. After traveling through the cation tank 14, the now "decationized water" travels through the transfer conduit 23 to the anion section 10b of the apparatus. The anion control valve assembly 28, like the valve assembly 18, places one of the anion tanks on-line while maintaining the other tank off-line. Assuming for purposes of explanation that the anion tank 24 is on-line, the decationized water travels from the transfer conduit 23 through the anion tank 24, exchanging negative ions such as chloride, sulfate, phosphate, carbonate with hydroxyl (OH) ions held by the anion resin. The now "deionized" water leaves the on-line anion tank and is discharged into the outlet conduit 62.

In the preferred deionization method and apparatus, the flow of water through the cation and anion sections 10a, 10b are individually monitored and the regeneration of each section is totally independent of the other. To achieve this feature, the cation and anion control valve assemblies 18, 28 each contain a monitoring device, preferably a usage monitoring turbine disposed in the fluid supply path. In the case of the cation valve assembly, the usage turbine monitors the quantity of decationized water discharged from the on-line cation tank into the transfer conduit 23. The usage turbine mechanism forming part of the anion control valve assembly 28 monitors the quantity of deionized water discharged from the on-line anion tank into the outlet conduit 62. When a predetermined quantity of decationized water is discharged, the on-line cation tank is placed off-line and regenerated. Similarly, when a predetermined amount of deionized water is discharged, the on-line anion tank is placed off-line and regenerated. Due to the dual tank configuration of the cation and anion sections, service is not interrupted during a regeneration cycle.

In the preferred regeneration method, a cation tank is regenerated by passing regeneration fluid through the tank in a counterflow direction, that is, in a direction opposite to the flow of water through the tank during the deionization process. After passing regeneration fluid through the tank, the tank is rinsed with decationized water from the on-line tank, which is also passed through the tank in a counterflow direction. After regeneration, the control valve assembly maintains the regenerated tank off-line until the on-line tank is exhausted.

A similar regeneration method is employed to regenerate an exhausted anion tank. Anion regeneration fluid is passed through the anion tank in a counterflow direction which is then followed by a counterflow rinse using deionized water from the on-line anion tank.

In the preferred method of operation, the regeneration supply line portion 40a is cleansed of residual regeneration fluid as part of the rinse cycle. By rinsing the supply line, regeneration fluid is prevented from "leaching" into the control valve assembly after the regeneration cycle is complete. According to a feature of the invention, the flushing of the regeneration supply line 40a also provides a counterflow "slow rinse" step prior to a full rinse of the tank. This process step has been found to make better use of the regeneration fluid because it allows an extra reaction time in the resin bed.

Figure 3:
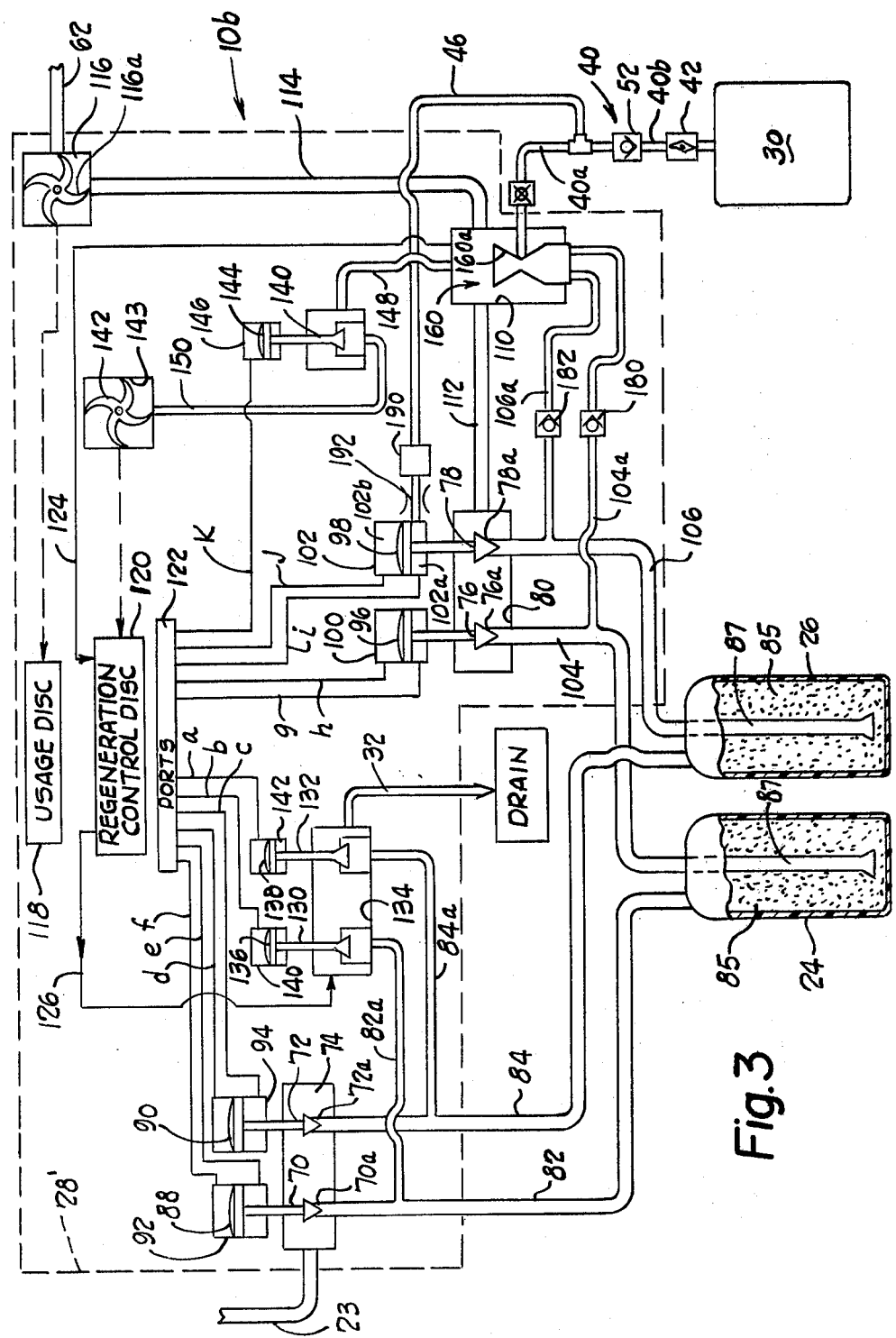
FIG. 3 is a diagrammatic representation of a portion of the apparatus shown in FIGS. 1 and 2.

FIG. 3 schematically illustrates the construction of the anion section 10b of the deionization apparatus. The components forming part of the anion control valve assembly 28 are surrounded by the dash line, designated by the reference character 28' in this figure. The construction of the anion control valve assembly 28 is somewhat similar to the construction of the water softener control valves disclosed in U.S. Pat. Nos. 3,891,552 and 4,298,025 which are hereby incorporated by reference. Reference should be made to these patents for constructional details not shown or discussed here.

The control valve assembly 28 controls the intercommunication between the tanks 24, 26, the communication between these tanks and the transfer conduit 23, and the regeneration of an exhausted tank.

The valve assembly 28 includes a plurality of water pressure operated valves, the opening and closing of which are controlled by a fluid signal control system. Whether the tanks 24, 26 are on-line or off-line is determined by a pair of inlet valves 70, 72 disposed in an inlet chamber 74 and a pair of outlet valves 76, 78 disposed in an outlet chamber 80. The transfer conduit 23 fluidly communicates with the inlet chamber 74. The inlet valves 70, 72 control the communication between the inlet chamber 74 and respective tank inlet passage 82, 84. Opening the valves 70, 72 allows decationized water in the transfer conduit 23 to proceed into the tanks 24, 26, respectively. In the illustrated tank construction, water to be treated enters the top of the tank, passes through ion exchange material 85 and then leaves the tank through a discharge riser 87 that opens near the bottom of the tank. It should be noted that reverse flow through the tank is also contemplated by the present invention.

The valves 70, 72 are operatively connected to a piston 88, 90 disposed in chamber 92, 94, respectively. The application of fluid pressure above the pistons apply valve closing forces to urge the valves 70, 72 into engagement with respective valve seats 70a, 72a. The application of fluid pressure to the underside of the pistons exert valve opening forces.

The outlet valves 76, 78 are similarly configured and include pistons 96, 98 disposed in chambers 100, 102. The application of fluid pressure above and below the pistons 96, 98 applies valve closing and opening forces, respectively for moving the valves 76, 78 towards and away from associated valve seats 76a, and 78a.

The valves 76, 78 control the communication between tank outlet passages 104, 106 of the tanks 24, 26, respectively with the outlet chamber 80. The outlet passages 104, 106 are connected to the top of the discharge risers 87 of the tanks 24, 26, respectively. When either of the valves are open, water flow from the associated tank is allowed to proceed to a water collection chamber 110 by way of a passage 112. The collection chamber 110 communicates with the outlet conduit 62 through a fluid path that includes a passage 114 and an outlet chamber 116 that includes a rotatable turbine 116a. As fully described in U.S. Pat. Nos. 3,891,552 and 4,298,025, the turbine is mechanically coupled to a usage monitoring disc 118 which rotates as a function of the amount of water discharged through the outlet chamber 116 into the outlet conduit 62.

The monitoring disc 118 forms part of a water pressure operated control system that controls the generation of fluid signals and the sequence of application of the fluid signals to the piston chambers associated with the various valves.

The monitoring disc 118 cooperates with a regeneration control disc 120. The control disc rotates atop an annular insert 122 that defines a plurality of ports each communicating with an associated signal line. Signal lines a–k are illustrated in FIG. 3; each line extends from the port insert 122 to one of a plurality of piston chambers. The control disc 120 sealingly engages the top surface of the insert 122 and includes structural formations that operate to communicate the ports formed in the insert 122 with either water supply pressure (supplied by a passage 124) or ambient pressure (by communicating the ports with a drain passage 126). The ports and regeneration control disc 120 are arranged so that as the regeneration wheel rotates, the valves are sequentially operated in order to cycle an exhausted tank through a regeneration cycle.

In addition to the valve elements described above, the control valve assembly 28 also includes a pair of drain valves 130, 132 for controlling the communication of the tank inlet passages 82, 84, respectively, with a drain chamber 134 through respective branch passages 82a, 84a. The drain chamber 134 communicates with an ambient pressure drain through the drain conduit 32 shown in FIGS. 1 and 2.

The drain valves 130, 132 are operated by pistons 136, 138 disposed in respective piston chambers 140, 142. In the preferred embodiment, the pistons are single acting and are driven to a valve open position by the application of fluid pressure to their top surfaces via signal lines a, b. The valves 130, 132 are arranged so that pressure in the branch lines 82a, 84a bias the valves towards their closed positions illustrated in FIG. 3.

A regeneration control valve 140 controls the communication of water pressure from the water collection chamber 110 to a regeneration control turbine 142. The valve 140 includes a single acting piston 144 disposed in a chamber 146. Like the drain valves 130, 132, the valve 140 is biased to its closed position by water pressure in the collection chamber 110 communicated through a passage 148. When the regeneration control valve 140 is opened (by the application of a fluid signal to the top surface of the piston by way of the signal line k) water pressure is allowed to proceed along the passage 148 to a passage 150 which includes a nozzle (not shown) for directing water against the turbine 142. The turbine 142 is mechanically coupled to the regeneration control disc 120 so that rotation of the turbine effects rotation of the control disc.

The application of fluid signals to the various piston chambers, as controlled by the relative movement of the regeneration control wheel with respect to the port insert 122, determines the sequence of valve actuation. The control disc 120 selectively communicates either water pressure from the collection chamber, fed to the wheel by the pressure 124, or the ambient drain pressure via the passage 126, to the various signal lines.

The regeneration components include a regeneration fluid aspirator 160 disposed in the collection chamber 110. The aspirator comprises a fluid flow regulating element (not shown) and a venturi 160a. The outlet of the venturi communicates with the tank outlet passages 104, 106 through branch passages 104a, 106a that include check valves 180, 182. The throat of the venturi communicates with the regeneration supply vessel 30 through the supply conduit portions 40a, 40b (shown also in FIGS. 1 and 2).

When either of the drain valves 130, 132 are opened, water in the collection chamber 110 is allowed to proceed through the venturi 160a and into the associated anion tank. For example, suppose the drain valve 130 is opened. Water from the collection chamber will flow through the venturi 160a into the outlet passage 104 of the tank 24. The water will then travel through the tank 24 in a counterflow direction and be ultimately discharged to the ambient drain by way of the inlet passage 82, the branch passage 82a and the drain chamber 134. As water passes through the venturi, regeneration fluid is drawn from the vessel 30 and mixed or "aspirated" with the venturi fluid. The regeneration fluid (now diluted with deionized water) passes through the anion tank until the associated drain valve is closed. The effluent from the tank is discharged to drain via the drain chamber.

According to the invention, the deionization apparatus includes a circuit for flushing residual regeneration fluid from the portion 40a of the regeneration supply conduit. In the preferred embodiment, the chamber 102 that houses the valve piston 98 communicates with the flushing conduit 46. In the preferred embodiment, a lower portion 102a of the chamber 102 (the portion below the piston) communicates with a flushing chamber 190, forming part of the control valve assembly, through a restricted passage 192. The flushing conduit 46 is connected to the flushing chamber on one end and joins the regeneration supply portion 40a at the tee connection 50 which is downstream of the check valve 52. Whenever the lower portion 102a of the piston chamber of the valve 78 receives signal pressure from the control system, a restricted flow of this signal pressure is allowed to proceed through the restricted passage 192 to the flush chamber 190 and enters the regeneration supply conduit 40a by way of the flushing conduit 46. Because the pressure of water in the flushing conduit 46 is higher than the pressure of the regeneration fluid being drawn into the venturi 160a, the flow of regeneration fluid from the vessel 30 terminates and signal fluid then passes through the downstream portion 40a of the regeneration supply line 40 into the venturi, flushing that portion of the line of regeneration fluid.

In addition to flushing regeneration fluid, the circuit shown in FIG. 3 also provides a "slow rinse" cycle in which deionized water is slowly passed, in a counterflow direction, through a tank being regenerated. This is achieved as follows: Once the residual regeneration fluid is flushed from the line 40a, the flow of deionized water from the collection chamber 110 into the tank is continued for a predetermined period. The presence of pressure in the flushing conduit 46 prevents regeneration fluid from the vessel 30 from being aspirated by the venturi 160a. Thus, only deionized water will pass through the off-line tank into the drain, effecting a "slow rinse" of the tank.

The overall operation of the anion section 10b is as follows. Assume for purposes of explanation that the tank 24 is on-line and the tank 26 is regenerated and is off-line. Under these conditions, the inlet valve 70 and outlet valve 96 are open and water travels from the conduit 23, to the tank 24 via the passage 82, leaves the tank by way of the passage 104, travels through the passage 112, the collection chamber 110, the passage 114, finally being discharged into the outlet conduit 62 after traveling by the turbine 116a in the outlet chamber 116. After the usage disc 118 is rotated by the turbine 116a through a predetermined arc, corresponding to a predetermined amount of water discharged by the tank 24, a regeneration cycle is initiated. As fully disclosed in U.S. Pat. Nos. 3,891,552 and 4,298,025, the monitoring disc 118 initiates regeneration by causing an initial rotation in the regeneration control disc 120 which uncovers a port communicating with the signal line k thus causing the application of water pressure to the chamber 146, effecting opening of the regeneration control valve 140. Once the valve 140 opens, a flow of water from the collection chamber 110 against the regeneration control turbine 142 is established, thus causing the continued rotation of the control disc 120.

As mentioned earlier, as the regeneration control disc rotates, ports defined by the insert 122, communicating with the signal lines a–k are communicated with either water pressure or drain pressure to either open or close the various valves. In the preferred regeneration cycle of the tank 24, the inlet valve 72 and the outlet valve 78a are opened by pressurizing the signal lines c and i, thus placing the tank 26 in parallel service with the tank 24. The inlet and outlet valves 70, 76 are then closed by pressurizing the signal lines f, h thus placing the tank 24 off-line.

Regeneration of the tank 24 commences by pressurizing the signal line b to open the drain valve 130 so that the inlet passage 82 of the tank 24 is communicated to the drain conduit 32 via the passage 82a and drain chamber 134. The opening of the drain valve 130 establishes a fluid path between the collection chamber 110, and the drain. Deionized water in the collection chamber travels through the venturi 160a and into the outlet passage 104 by way of the branch passage 104a and check valve 180. As the deionized water passes through the venturi 160a, regeneration fluid from the vessel 30 is drawn into and mixed (or aspirated) with the water. The regeneration fluid mixture travels through the tank 24 in a counterflow direction, that is from the oultet passage 104 to the inlet paassage 82 and is eventually discharged to the drain.

After a predetermined rotational movement in the regeneration control disc 120, a flushing step commences. As disclosed earlier, the lower portion 102a of the piston chamber 102 communicates with a flush chamber 190 through a restricted passage 192. Whenever the signal line i is pressurized, a fluid flow path between the lower chamber 102a and the regeneration supply conduit portion 40a is established. When the regeneration of the tank 24 is first initiated, the signal line j is depressurized and the signal line i is pressurized to ensure opening of the outlet valve 78. After a relatively short interval of time, the signal line i is depressurized. The valve 78, however, remains open.

The flushing step commences by repressurizing the signal line i. The water communicated by the signal line, travels through the restricted passage 192, the flushing chamber 190, the conduit 46 and enters the downstream portion 40a of the regeneration supply conduit 40. The flow of water into the conduit portion 40a from the conduit 46 overpowers the suction of the venturi 160a thereby terminating the flow of regeneration fluid from the vessel 30. The check valve 52 prevents the flushing water from traveling to the vessel 30.

In a preferred embodiment, the flow of signal pressure to the chamber 102a and hence and flushing conduit 46 is maintained in order to provide a slow-rinse of the anion tank. Once the conduit portion 40a is flushed of residual regeneration fluid, the continued flow of fluid into the conduit 46 prevents further regeneration fluid from being aspirated with the water flowing through the venturi 160a. The unaspirated flow of deionized water through the venturi slowly rinses the tank 24 of regeneration effluent. After a predetermined interval, the regeneration control disc 120 rotates and pressurizes signal line g to open the outlet valve 76 to establish a fast rinse step in which deionized water from the tank 26 is communicated to the outlet passage 104 of the tank 24. The rinse water travels through the tank in a counterflow direction and is discharged to the drain. After the fast rinse step, the signal line b is depressurized to effect closure of the drain valve 130 thus placing the regenerated tank 24 off-line until the tank 26 is exhausted.

The regeneration of the tank 26 is substantially identical to the regeneration cycle of the tank 24, it should be noted that the outlet valve 78 remains closed for a major portion of the regeneration cycle of the tank 26. In particular, the valve 78 remains closed during the flushing cycle even though the signal line i is pressurized. This is achieved by the differential areas of the piston 98. With the preferred configuration, the valve 78 remains closed when both the signal line i and signal line j are pressurized due to the larger area of the piston top surface. The valve 78 is opened for the fast rinse step by depressurizing the signal line j while maintaining pressurization of the signal line i. Even through the fluid signal continues to flow out of the chamber 102a, the restricted passage 192 insures that a sufficient back pressure is maintained in the chamber 102a to apply the necessary opening force to the piston 98 to effect opening of the valve 78. Once the valve is opened, the signal line i is depressurized to terminate the flow of water into the flushing chamber and conduit 46.

Although the flushing circuit has been described in connection with the anion section 10b, a similar flushing circuit can be readily incorporated in the cation section 10a. It has been found that the cation regeneration fluid such as hydrochloric acid is not as prone to "leaching" into the control valve assembly and normally does not cause clogging of the various orifices as does the anion regeneration fluid. For this reason the disclosed deionization apparatus may be operated without a flushing circuit forming part of the cation section 10a when hydrochloric acid is used as a regeneration fluid. However, should other regeneration fluids be used and/or should a slow rinse step be desired, a flushing circuit as described above would preferably form part of the cation section.

Turning now to FIGS. 4–7, additional details of the anion control valve assembly 28 are illustrated. The drain conduit 22, the regeneration supply conduit portion 40a and the flushing conduit 46 are connected to the control valve assembly 28 by threaded fittings 200, 202, 204, respectively (shown in FIG. 4).

Decationized water from the transfer conduit 23 (shown in FIGS. 1-3) enters the valve assembly through an inlet fitting 23a. Deionized water leaves the valve assembly 28 after passing through one of the anion tanks 24, 26 through an outlet fitting 62a. As seen in FIG. 1, the main body of the valve assembly 28 sits atop the anion tank 24 and is connected to the tank 26 by an extension housing 210 that includes conduits 212, 214. When the tank 26 is placed on-line, water to be deionized enters the tank 26 from the conduit 212 and leaves the tank through the conduit 214. The phantom line 87a indicates the position of the discharge riser 87 (shown in FIG. 3), positioned centrally within the tank 24 through which the deionized water leaves the tank.

The broken away portions of the valve illustrate the position of the operating piston 98 for the outlet valve 78 shown in FIG. 3. The flushing chamber 190 is formed integrally within the valve body, immediately adjacent the piston 98. As seen in FIG. 5, the threaded connector 206 communicates with the interior of the flushing chamber 190 and hence any fluid in the chamber is communicated to the flushing conduit 46. The fluid signal in the lower piston chamber 102a (shown also in FIG. 3) is communicated to the flushing chamber 190 by a relatively small diameter tube 218 located in a slot 218a. The tube 218 forms the restricted passage 192 shown in FIG. 3. The slot 218a extends from the piston chamber 102a underneath a piston chamber-defining wall 220. The tube 218 is sized so that the cross sectional area of the tube passage is less than the signal line i so that a back pressure is generated in the chamber 102a. This back pressure is sufficient to open the outlet valve 102 whenever the upper chamber 102b is depressurized.

It has been found that if the signal line i is 0.125" in diameter, a tube having an inside diameter of approximately 0.040 provides satisfactory results. In this example, the ratio of diameters is approximately 2:1. In the preferred construction, the tube 218 is "potted" in the slot 218a so that the surface above the tube is flush with the surrounding area. Alternately, the tube 218 may be eliminated by critically sizing the slot 218a so that it forms a restricted passage. In otherwords, the cross-sectional area of the slot 218a would be less than the cross-sectional area of the signal line i.

Figure 7:
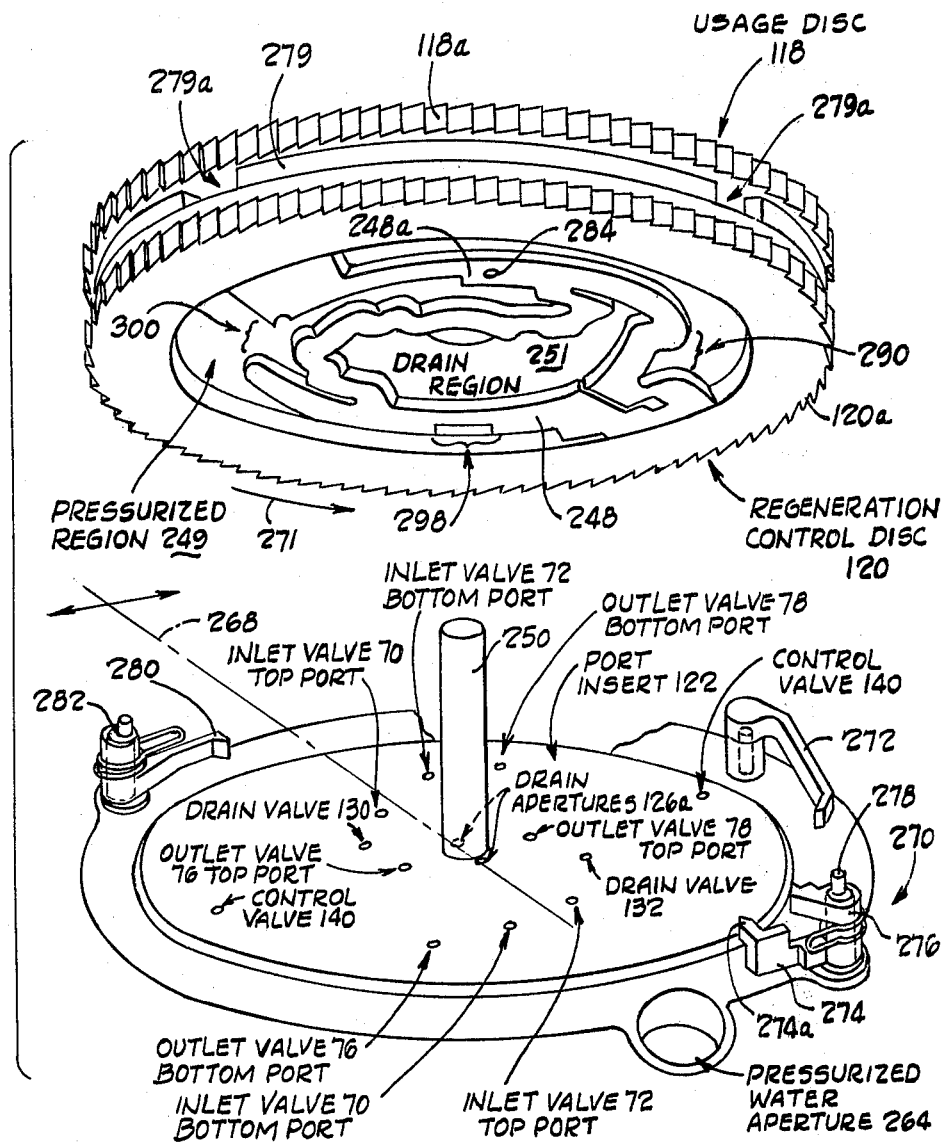

Referring also to FIGS. 6 and 7, the regeneration control disc 120 sealingly engages and rotates atop the circular port-defining insert 122. The ports defined by the insert communicate with the various piston chambers. The underside of the regeneration control disc 120 includes a depending wall 248 that divides the underside of the disc 120 into pressurized and drain regions 249, 251. The port insert 122 includes a pair of drain apertures 126a located on either side of an upwardly extending stub shaft 250 about which both the regeneration control disc 120 and the water usage disc 118 rotate. The drain apertures 126a communicate with the drain chamber 134 through the passage 126 (shown in FIG. 3) which is integrally formed in the valve body. Thus, the drain region of the regeneration control disc is maintained at the ambient drain pressure.

As seen best in FIG. 6, the discs 118, 120 rotate in a chamber 258 defined by a recess 260 formed in the top of the housing and a top cover 262 which overlies the recess. As seen in FIG. 7, pressurized deionized water is admitted to the chamber 256 through an aperture 264. The aperture 264 is represented by the feed line 124 in FIG. 3.

Two sets of ports are provided in the insert 122 and are located symmetrically about an imaginary diametral line 268. The ports to the left of the line 268 control the regeneration sequence for the tank 24 whereas the ports to the right of the line 268 control the regeneration sequence for the tank 26. During a regeneration cycle, the control disc 120 rotates 180° to effect the complete regeneration cycle of one of the tanks. The location of the ports and their function, as shown in FIG. 7 correspond to the ports shown and described in U.S. Pat. Nos. 3,891,552 and 4,298,025. As fully explained in these earlier patents, the depending wall 248 controls the communication of pressurized water from the pressurized region 249 to the ports or communicates the ports with the drain region 251 to depressurize the respective chambers. The ports and their function are labeled in FIG. 7 and indicate which valves they are associated with. The inlet and outlet valves 70, 72, 76 and 78 each include "top" and "bottom" ports. The "top ports" communicate with the top of the associated operating pistons 88, 90, 96, 98 and the pressurization of these ports apply a valve closing force. Conversely, the "bottom ports" communicate with the underside of the pistons and apply valve opening forces when pressurized.

Usage disc 118 and the regeneration control disc 120 are preferably rotated by a drive mechanism fully disclosed in U.S. Pat. No. 4,298,025. Referring to both FIGS. 6 and 7, the discs 118, 120 are driven by a ratcheting mechanism that includes a plurality of pawls. As seen best in FIG. 7, the usage disc 118 rotates atop and concentrically with the regeneration control disc 120. The discs 118, 120 each include peripheral ratchet teeth 118a, 120a respectively. The water usage disc 118 is rotated by a pawl arrangement indicated generally by the reference character 270. Both discs rotate in the direction indicated by the arrow 271; an anti-reverse pawl 272 prevents reverse rotation of the disc 118.

The pawl arrangement 270 includes a pair of individual, spring bias pawls 274, 276, concentrically journalled on an eccentric shaft 278. The shaft 278 is coupled to the water usage turbine 116a through a reduction gear train (not shown). In operation, the usage turbine 116a and hence the water usage disc 118 rotates in proportion to the amount of deionized water discharged by the valve assembly 28. (A similar monitoring arrangement forms part of the valve assembly 18 of the cation section and monitors the amount of decationized water discharged by the valve.)

The usage disc 118 also includes an axially depending flange 279 that is interrupted by a plurality of circumferentially spaced slots 279a.

The number and position of the slots 279a determine the frequency of regeneration. The lower pawl 274 of the ratchet mechanism 270 includes a prong 274a that extends into sliding engagement with the flange 279. The prong 274a is sized so that when in engagement with the flange, the pawl 274 is maintained out of engagement with the regeneration control disc 120. When the prong 274a, however, enters one of the slots 279a, the pawl 274 engages the ratchet teeth 120a of the regeneration control disc 120 so that rotation of the eccentric shaft 278 causes concurrent rotation in the discs 118, 120. The initial rotation of the regeneration control disc 120 by the lower pawl 274 causes one of the control valve ports in the port insert 122 to be pressurized, thus initiating regeneration.

When the control valve 140 (shown in FIG. 3) is open, a fluid stream is directed to the regeneration turbine 142 (shown in both FIGS. 3 and 6) located in a turbine chamber 143. The turbine 142 is mechanically coupled to a regeneration drive pawl 280 through a reduction gear train, indicated generally by the reference character 281 in FIG. 6. The pawl is journaled in an eccentric shaft 282. Rotation of the turbine 142 thus effects incremental rotation of the regeneration control disc 120 and in so doing, effects a regeneration cycle. The regeneration cycle continues until the control port communicating with the control valve chamber 146 (shown in FIG. 3) is depressurized thus closing the control valve 140. During regeneration, a nozzle (not shown) directs a stream of water against the turbine 142.

The configuration of the depending wall 248 includes structure for controlling the flushing step that occurs during the regeneration cycle. As described earlier, fluid flow for the flushing step is obtained from the lower piston chamber 102a of the outlet valve 78. As seen in FIG. 3, whenever the signal line i is pressurized, and at least one of the drain valves 130, 132 are open, fluid will flow out of the piston chamber 102a through the restricted passage 192 and into the flushing chamber 190. From there, fluid will flow through the conduit 46 into the regeneration supply line 40a and into the venturi 160a.

Returning to FIG. 7, the discs 118, 120 rotate in the direction indicated by the arrow 271. During regeneration of the tank 26, the portion of the depending wall indicated by the reference character 248a initially covers the "outlet valve 78 bottom port" that feeds the signal to the lower chamber 102a. As regeneration commences, the "outlet valve 78 top port" for the upper chamber of the outlet valve 78 is exposed to the pressurized region while the "outlet valve bottom port" is placed in communication with the drain by an aperture 284 formed in the depending wall 248 that communicates with a depressurized zone in the disc by a passage 284a (shown in FIG. 6). As seen in FIG. 6, the passage 284a extends from the depending wall 248 to a cavity 286 defined by a hub portion 120b of the regeneration control disc 120 and a balancing piston 288 which as described in the earlier patents, serves as a means for biasing the regeneration control disc 120 into sealing contact with the port insert 122. The cavity 286 communicates with the ambient drain through the drain apertures 126a discussed earlier. Thus, when the aperture 284 overlies the "outlet valve bottom port", the lower chamber 102a is communicated with the ambient drain. The combination of ambient drain pressure in the lower chamber and pressurization of the top chamber 102b (through the "outlet valve 78 top port"), causes the outlet valve 78 to contact its associated seat 78a thus closing off the outlet from the tank 26.

As regeneration proceeds, the depending wall 248 again covers the "outlet valve 78 bottom port" while the "outlet valve 78 top port" remains pressurized to maintain closure of the outlet valve 78. As the control disc advances, the "outlet valve bottom port" eventually reaches the opening in the depending wall 248 indicated by the arrow and bracket 290. This opening exposes the "bottom port" to the pressurized region 249 thus delivering a fluid signal to the lower piston chamber 102a through signal line i (shown in FIG. 3). A portion of the signal flow leaves the chamber 102a through the slot 218 (restricted passage 192 in FIG. 3) and enters the flushing conduit 46. The pressurized water fed into the regeneration supply line 40a, "overpowers" the suction of the venturi 160a, thereby stopping the inflow of regeneration fluid from the vessel 30. The flow of water from the lower piston chamber 102a flushes the supply lines, venturi and provides a slow rinse of the tank 26.

During the flushing step, the outlet valve 78 remains closed although both the upper and lower chamber portions 102a, 102b may be pressurized, because the upper area of the piston is larger than the lower area. At the conclusion of the flushing step, the "outlet valve 78 top port" is depressurized (by exposing it to the drain region 251). The back pressure created in the lower chamber creates enough force to open the outlet valve 78 and thereby places the unit into a fast rinse cycle in which deionized water from the outlet chamber 80 is fed into the tank 26 via the outlet passage 106, the inlet passage 84, the branch passage 84a and drain valve 132. At the conclusion of the regeneration cycle for the tank 26, the "outlet valve 78 bottom port" ends up exposed to pressure at the depending wall section indicated by the arrow and bracket 298. At this position, the lower chamber 102b remains pressurized but flow through the flushing circuit does not occur because neither drain valve 130, 132 is open.

During regeneration of the tank 24, the tank 26 is first placed on-line by opening both the inlet valve 70 and the outlet valve 78. Because the lower chamber 102a is pressurized at the outset of regeneration, depressurizing the top chamber 102b will insure that the valve 78 is driven upwardly by the pressure in the lower chamber 102b. As the control disc 120 advances, the "outlet valve 78 bottom port" is covered by the depending wall 248 so that flow through the flushing circuit will not occur when the associated drain valve 130 is open. As the regeneration proceeds, the "bottom port" eventually reaches the depending wall section indicated by the bracket and arrow 300 which exposes the "outlet valve 78 bottom port" to pressurized fluid, thus effecting a flushing step. At the conclusion of the regeneration of the tank 24, the "bottom port" is again covered by the depending wall 248.

As indicated earlier, if a flushing step and/or a slow rinse is desired for the cation section 10b of the deionizing apparatus, the circuitry and components described in connection with the anion section 10b can be incorporated as part of the cation section.

The regeneration frequency of both the cation and anion sections are controlled independently as a function of the water treated by the individual sections. The regeneration frequency is determined by the slots 279a forming part of the usage disc 118 and can also be modified by changes in the gear reduction between the monitoring turbine 116a and the eccentric shaft 278.

The flushing circuit and slow rinse feature of the present invention can also be included as part of a water softening apparatus. In a water softening application, softened water would be fed through the flushing conduit and into the water softener regeneration fluid line to flush the line of residual regeneration fluid and if desired to provide a slow rinse of a water softener resin tank.

Although the invention has been described with a certain degree of particularity, it should be understood that various changes can be made to it by those skilled in the art without departing from the spirit or scope of the invention as hereinafter claimed.

We claim:

1. A deionization apparatus, comprising:
   (a) a pair of cation tanks each tank defining a first port, a second port and a fluid flow path between said ports extending through a cation exchange resin disposed in each tank;
   (b) a pair of anion tanks, each defining a third port, a fourth port, and a fluid flow path between said third and fourth ports extending through anion exchange resin disposed in each anion tank;
   (c) structure defining an inlet for water to be deionized, an outlet for deionized water, and an intermediate transfer means for transferring decationized water from said cation tanks to said anion tanks;
   (d) a cation control valve assembly including water pressure operated cation valves for controlling the inter-communication between said cation tanks and between said inlet and said transfer means;
   (e) an anion control valve assembly including water pressure operated anion valves for controlling the inter-communication between said anion tanks and between said transfer means and said outlet;
   (f) a source of cation regeneration fluid including a cation supply line through which cation regeneration fluid is fed to said control valve assembly during at least a portion of a cation regeneration cycle;

(g) a source of anion regeneration fluid including an anion supply line through which anion regeneration fluid is fed to said anion control valve assembly during at least a portion of a regeneration cycle and a check valve operative to prevent reverse fluid flow to said anion regeneration source;

(h) water pressure operated cation control system within said cation valve assembly for selectively actuating said valves in a predetermined sequence, the cation control system including means responsive to the amount of water conveyed through said cation control valve assembly and operative to initiate and effect a regeneration cycle in one of said cation tanks upon sensing a predetermined quantity of water;

2. The apparatus of claim 1 further comprising:

(a) a check valve in said anion supply line for preventing reverse flow to said source of anion regeneration fluid; and, (b) an anion flushing circuit for cleansing said anion regeneration fluid supply line including means for transferring a fluid signal from said anion control system to said anion supply line downstream of said check valve.

3. The apparatus of claim 2 further comprising a cation flushing circuit for cleansing the cation supply line.

4. A method for deionizing water, comprising the steps of:

(a) providing a pair of cation tanks, each containing cation exchange material, and a pair of redundant anion tanks, each containing anion exchange material;

(b) placing one of said cation and anion tanks on-line in serial fluid communication, while maintaining said other cation and anion tanks off-line;

(c) introducing water to be deionized into said on-line cation tank and conveying said water along a flow path extending through said cation exchange material to remove cations from said water;

(d) transferring the decationized water from the on-line cation tank to the on-line anion tank and conveying the transferred decationized water along a flow path extending through the anion exchange material to remove anions from said water;

(e) discharging the deionized water from the on-line anion tank;

(f) monitoring the quantity of water conveyed through the on-line cation tank;

(g) regenerating the cation tank upon sensing a quantity of water corresponding to a near depleted condition of the cation tank discharged by said one cation tank, the method of regeneration comprising the steps of:

(i) placing the off-line cation tank on-line in a serial communication with the on-line anion tank and placing the depleted cation tank off-line;

(ii) conveying a cation regeneration fluid through said flow path in the depleted off-line cation tank in a counterflow direction for a predetermined time and discharging the regeneration fluid from said cation tank into a drain means;

(iii) rinsing said off-line cation tank by conveying decationized water from the on-line cation tank along the cation flow path in the off-line cation tank in a counterflow direction and discharging the rinse water to said drain means;

(iv) maintaining the regenerated tank off-line until the on-line cation tank requires regeneration;

(h) monitoring the amount of water conveyed through said on-line anion tank, independently of the monitoring of the on-line cation tank;

(i) regeneration the on-line anion tank upon sensing a predetermined quantity of water corresponding to a near depleted condition of the anion tank, the method of comprising the steps of:

(i) placing the off-line anion tank on-line, in serial communication with the on-line cation tank and placing the depleted anion tank off-line;

(ii) conveying an anion regeneration fluid through said flow path in the depleted off-line anion tank in a counterflow direction for a predetermined time and discharging the anion regeneration fluid from said anion tank into the drain means;

(iii) rinsing said off-line anion tank by conveying deionized water from the on-line anion tank along the anion flow path in the off-line anion tank in a counterflow direction and discharging the rinse water into the drain means;

(iv) maintaining the regenerated anion tank off-line until the on-line anion tank requires regeneration.

5. The method of claim 4 wherein the regeneration of the depleted anion tank further comprises the step of slow rinsing said anion tank by communicating deionized water from said on-line anion tank to said anion regeneration fluid supply conduit.

6. The method of claim 4 wherein the regeneration of the depleted anion tank further comprises the step of flushing residual anion regeneration fluid from a regeneration fluid supply conduit with deionized water from the on-line anion tank.

7. The method of claim 6 wherein the step of flushing residual anion regeneration fluid is provided by communicating a fluid signal to said regeneration fluid supply conduit, said fluid signal being generated by a deionization process control valve assembly.

8. An ion exchanging apparatus, comprising:

(a) at least two tanks, each containing ion exchange material;

(b) each tank defining first and second ports and a fluid flow path between said ports that extends through said ion exchange material;

(c) structure defining an inlet to said apparatus for water to be treated and an outlet from said apparatus, for treated water;

(d) a valve assembly for controlling the fluid communication between said tanks, said inlet, and said outlet, said valve assembly including means for selectively placing one of said tanks in service while regenerating the other tank and further operative to place said other tank into service until said one tank requires regeneration;

(e) a source of regeneration fluid for regenerating said ion exchange material, including a regeneration supply conduit for supplying regeneration fluid from said source to said valve assembly and a check valve for preventing fluid flow from said control valve assembly to said source;

(f) means for discharging effluent to drain during a regeneration cycle;

(g) a fluid pressure operated outlet valve, disposed in said valve assembly, for controlling the communication of the second port of one tank with said outlet, said outlet valve including an operating piston slidably disposed in an expansible chamber means;

(h) means for communicating a fluid signal to said chamber means to apply a valve opening force to said outlet valve;

(i) means for rendering said opening force ineffectual to maintain closure of said outlet valve during predetermined periods of apparatus operation;

(j) restricted passage means communicating said fluid signal in said expansible chamber means to said regeneration supply conduit, downstream of said check valve whereby a restricted flow of said fluid signal is conveyed to said control valve assembly through said regeneration supply conduit thereby flushing said supply line of residual regeneration fluid, said restricted passage means operative to maintain a back pressure in said expansible chamber so that at least a partial opening force is applied to said outlet valve during flushing of said regeneration supply conduit.

9. The apparatus of claim 8 wherein said valve assembly includes a flush chamber for receiving said fluid signal pressure fluid from said restricted passage means and said apparatus further includes a flush conduit for communicating fluid from said flush chamber to said regeneration supply conduit.

10. The apparatus of claim 8 wherein said fluid signal is controlled by a water pressure operated control system forming part of said control valve assembly which is responsive to the amount of treated water discharged through said outlet.

11. A deionization apparatus, comprising:
(a) a pair of cation tanks each tank defining a first port, a second port and a fluid flow path between said ports extending through a cation exchange resin disposed in each tank;
(b) a pair of anion tanks, each defining a third port, a fourth port, and a fluid flow path between said third and fourth ports extending through anion exchange resin disposed in each anion tank;
(c) structure defining an inlet for water to be deionized, an outlet for deionized water, and an intermediate transfer conduit for transferring decationized water from said cation tanks to said anion tanks;
(d) a cation control valve assembly for controlling the inter-communication between said cation tanks and between said inlet and said transfer conduit;
(e) an anion control valve assembly including fluid pressure operated valves for controlling the inter-communication between said anion tanks and between said transfer conduit and said outlet;
(f) a source of cation regeneration fluid including a cation supply line through which cation regeneration fluid is fed to said control valve assembly during at least a portion of a cation regeneration cycle;
(g) a source of anion regeneration fluid including an anion supply line and check valve through which anion regeneration fluid is fed to said anion control valve assembly during at least a portion of a regeneration cycle and a check valve operative to prevent reverse fluid flow to said anion regeneration source;
(h) fluid pressure operated control system within said anion valve assembly for selectively actuating said valves in a predetermined sequence, said servo system including means responsive to the amount of deionized water discharged by said anion control valve assembly and operative to initiate and effect a regeneration cycle in one of said anion tanks upon sensing a predetermined volume of discharged deionized water from said anion tank;
(i) an anion flushing circuit for cleansing said anion regeneration fluid supply line including means for transferring a fluid signal from said anion servo control system to said anion supply line downstream of said check valve.

12. The apparatus of claim 11 further comprising a cation flushing circuit for cleansing said cation supply line.

13. The apparatus of claim 11 further comprising a check valve in said cation supply line operative to prevent reverse fluid flow to said cation regeneration source.

14. A method for deionizing water, comprising the steps of:
(a) providing a pair of cation tanks, each containing cation exchange material, and a pair of redundant anion tanks, each containing anion exchange material.
(b) placing one of said cation and anion tanks on-line in serial fluid communication, while maintaining said other cation and anion tanks off-line;
(c) introducing water to be deionized into said on-line cation tank and conveying said water along a flow path extending through said cation exchange material to remove cations from said water;
(d) transferring the decationized water from the on-line cation tank to the on-line anion tank and conveying the transferred decationized water along a flow path extending through the anion exchange material to remove anions from said water;
(e) discharging the deionized water from the on-line anion tank;
(f) monitoring the quantity of water conveyed through the on-line cation tank;
(g) regenerating the cation tank upon sensing a quantity of water corresponding to a depleted condition of the cation tank discharged by said one cation tank, the method of regeneration comprising the steps of:
(i) placing the off-line cation tank on-line in a serial communication with the on-line anion tank and placing the depleted cation tank off-line;
(ii) conveying a cation regeneration fluid through said flow path in the depleted off-line cation tank in a counterflow direction for a predetermined time and discharging the regeneration fluid from said cation tank into a drain means;
(iii) rinsing said off-line cation tank by conveying decationized water from the on-line cation tank along the cation flow path in the off-line cation tank in a counterflow direction and discharging the rinse water to said drain means;
(iv) maintaining the regenerated tank off-line until the on-line cation tank requires regeneration;
(h) monitoring the amount of water conveyed through said on-line anion tank, independently of the monitoring of the on-line cation tank;
(i) regenerating the on-line anion tank upon sensing a predetermined quantity of water corresponding to a depleted condition of the anion tank, the method of comprising the steps of:
(i) placing the off-line anion tank on-line, in serial communication with the on-line cation tank and placing the depleted anion tank off-line;
(ii) conveying an anion regeneration fluid through said flow path in the depleted off-line anion tank in a counterflow direction for a predetermined time and discharging the anion regeneration fluid from said anion tank into the drain means;

(iii) flushing residual anion regeneration fluid from a regeneration fluid supply conduit with deionized water from the on-line anion tank;

(iv) rinsing said off-line anion tank by conveying deionized water from the on-line anion tank along the anion flow path in the off-line anion tank in a counterflow direction and discharging the rinse water into the drain means;

(v) maintaining the regenerated anion tank off-line until the on-line tank requires regeneration.

15. The method of claim 14 wherein the step of flushing residual anion regeneration fluid is provided by communicating a fluid signal to said regeneration fluid supply conduit, said fluid signal being generated by a deionization process control valve assembly.

* * * * *